United States Patent
Yang et al.

(10) Patent No.: US 9,077,258 B2
(45) Date of Patent: Jul. 7, 2015

(54) REGULATION CIRCUIT ASSOCIATED WITH SYNCHRONOUS RECTIFIER PROVIDING CABLE COMPENSATION FOR THE POWER CONVERTER AND METHOD THEREOF

(75) Inventors: Ta-Yung Yang, Milpitas, CA (US); Chou-Sheng Wang, Keelung (TW)

(73) Assignee: System General Corp., Taipei Hsien (TW)

(*) Notice: Subject to any disclaimer, the term of this patent is extended or adjusted under 35 U.S.C. 154(b) by 319 days.

(21) Appl. No.: 13/551,705

(22) Filed: Jul. 18, 2012

(65) Prior Publication Data
US 2013/0027987 A1    Jan. 31, 2013

Related U.S. Application Data

(60) Provisional application No. 61/511,651, filed on Jul. 26, 2011.

(51) Int. Cl.
*H02M 3/335*  (2006.01)
*H02M 1/00*  (2007.01)

(52) U.S. Cl.
CPC .. *H02M 3/33592* (2013.01); *H02M 2001/0025* (2013.01); *Y02B 70/1475* (2013.01)

(58) Field of Classification Search
CPC .................................................. H02M 3/33592
USPC ................................. 363/21.12, 21.14, 21.15
See application file for complete search history.

(56) References Cited

U.S. PATENT DOCUMENTS

| | | | |
|---|---|---|---|
| 7,440,298 B2 | 10/2008 | Yang | |
| 8,077,481 B2 * | 12/2011 | Hua et al. | 363/15 |
| 2008/0285312 A1 * | 11/2008 | Fu et al. | 363/21.06 |
| 2011/0051464 A1 * | 3/2011 | Lou et al. | 363/21.02 |

* cited by examiner

*Primary Examiner* — Matthew Nguyen
(74) *Attorney, Agent, or Firm* — Rosenberg, Klein & Lee

(57) ABSTRACT

A regulation circuit of a power converter for cable compensation according to the present invention comprises a signal generator generating a compensation signal in accordance with a synchronous rectifying signal. An error amplifier has a reference signal for generating a feedback signal in accordance with an output voltage of the power converter. The compensation signal is coupled to program the reference signal. The feedback signal is coupled to generate a switching signal for regulating an output of the power converter. The regulation circuit of the present invention compensates the output voltage without a shunt resistor to sense the output current of the power converter for reducing power loss.

15 Claims, 3 Drawing Sheets

US 9,077,258 B2

REGULATION CIRCUIT ASSOCIATED WITH SYNCHRONOUS RECTIFIER PROVIDING CABLE COMPENSATION FOR THE POWER CONVERTER AND METHOD THEREOF

REFERENCE TO RELATED APPLICATIONS

This application is based on Provisional Patent Application No. 61/511,651, filed 26 Jul. 2011, currently pending.

BACKGROUND OF THE INVENTION

1. Field of the Invention

The present invention is related to a regulation circuit, especially to a regulation circuit associated with a synchronous rectifier providing cable compensation for the power converter.

2. Description of the Related Art

FIG. 1 shows a prior art of a power converter. A PWM controller (PWM) 30 generates a switching signal $S_{PWM}$ to switch a transformer 10 having a primary winding $N_P$ and a secondary winding $N_S$ via a power transistor 20 in accordance with a feedback signal $V_{FB}$ for regulating the output of the power converter. The primary winding $N_P$ of the transformer 10 is coupled to receive an input voltage $V_{IN}$. The feedback signal $V_{FB}$ is generated by an opto-coupler 60 in response to the output voltage $V_O$ of the power converter. The opto-coupler 60 is controlled by an error amplifier 50. The error amplifier 50 generates a signal $V_F$ coupled to control the opto-coupler 60. The error amplifier 50 includes a reference signal $V_R$ supplied with a positive input terminal of the error amplifier 50 for regulating the output voltage $V_O$. The output voltage $V_O$ is coupled to an negative input terminal of the error amplifier 50 via a voltage divider developed by resistors 51 and 52. A capacitor 53 is coupled between the negative input terminal of the error amplifier 50 and an output terminal of the error amplifier 50.

The secondary winding $N_S$ is coupled to an output terminal of the power converter to generate the output voltage $V_O$. A rectifier 40 is coupled to one terminal of the secondary winding $N_S$. An output capacitor 45 is coupled to the other terminal of the secondary winding $N_S$ and the output terminal of the power converter to generate the output voltage $V_O$. A resister 62 is coupled form the capacitor 45 and the rectifier 40 to the opto-coupler 60.

Generally, the output cable of the power converter has a voltage drop proportional to its output current. Sensing the output current to offset the voltage drop is an approach for the output cable compensation. However, it will generate a significant power loss while sensing the output current by using a shunt resistor. The present invention provides a method and apparatus to compensate the output voltage without the need of sensing the output current of the power converter by the shunt resistor.

BRIEF SUMMARY OF THE INVENTION

The object of the present invention is to provide a regulation circuit and a method with output cable compensation for the power converter. The regulation circuit and method compensate the output voltage without a shunt resistor to sense the output current of the power converter for reducing power loss.

The regulation circuit with output cable compensation for the power converter according to the present invention comprises a signal generator and an error amplifier. The signal generator generates a compensation signal in accordance with a synchronous rectifying signal. The error amplifier has a reference signal for generating a feedback signal in accordance with an output voltage of the power converter. The compensation signal is coupled to program the reference signal. The feedback signal is coupled to generate a switching signal for regulating an output of the power converter.

A method for the regulation circuit of the power converter according to the present invention comprises receiving the synchronous rectifying signal for generating the compensation signal, compensating the reference signal of the error amplifier of the regulation circuit in accordance with the compensation signal, and generating the feedback signal in accordance with the reference signal and the output voltage of the power converter. The feedback signal is coupled to generate the switching signal for regulating the output of the power converter.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
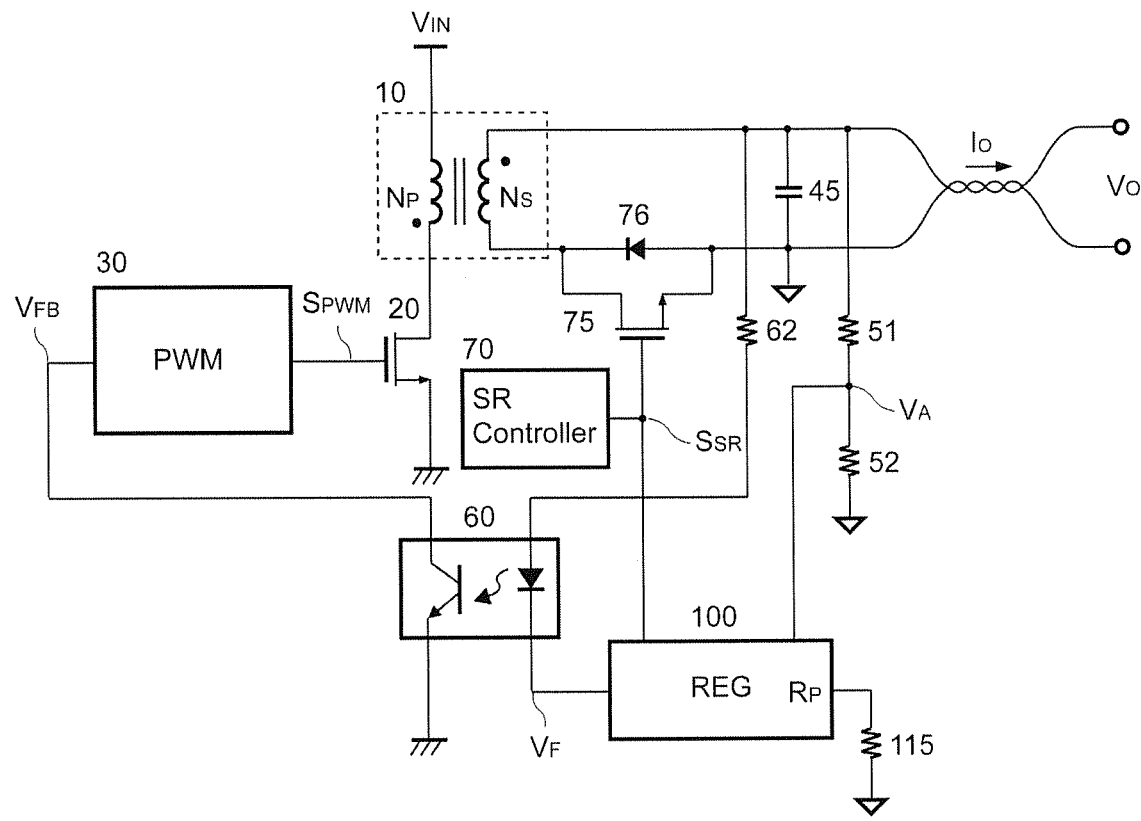
FIG. 2 shows a circuit diagram of a preferred embodiment of a power converter in accordance with the present invention.

FIG. 2 is a circuit diagram of a preferred embodiment of the power converter having a regulation circuit 100 according to the present invention. The power converter comprises the transformer 10, the power transistor 20, the PWM controller (PWM) 30, the opto-coupler 60, a synchronous rectifying (SR) controller 70, a power transistor 75, and the regulation circuit (REG) 100. The power transistor 20 is coupled from the primary winding $N_P$ of the transformer 10 to the ground for switching the transformer 10. The PWM controller 30 generates the switching signal $S_{PWM}$ to switch the power transistor 20 in accordance with the feedback signal $V_{FB}$ for regulating the output (output voltage $V_O$ and/or the output current $I_O$) of the power converter.

The opto-coupler 60 is coupled to the secondary winding $N_S$ of the transformer 10 through the resistor 62. The opto-coupler 60 generates the feedback signal $V_{FB}$ coupled to the PWM controller 30 in response to the output voltage $V_O$. The secondary winding $N_S$ is coupled to the output terminal of the power converter to generate the output voltage $V_O$. The output capacitor 45 is coupled to the secondary winding $N_S$ and the output terminal of the power converter to generate the output voltage $V_O$. The output voltage $V_O$ is outputted to the load through the output cable. The output current $I_O$ of the power converter flows through the output cable.

Figure 1:
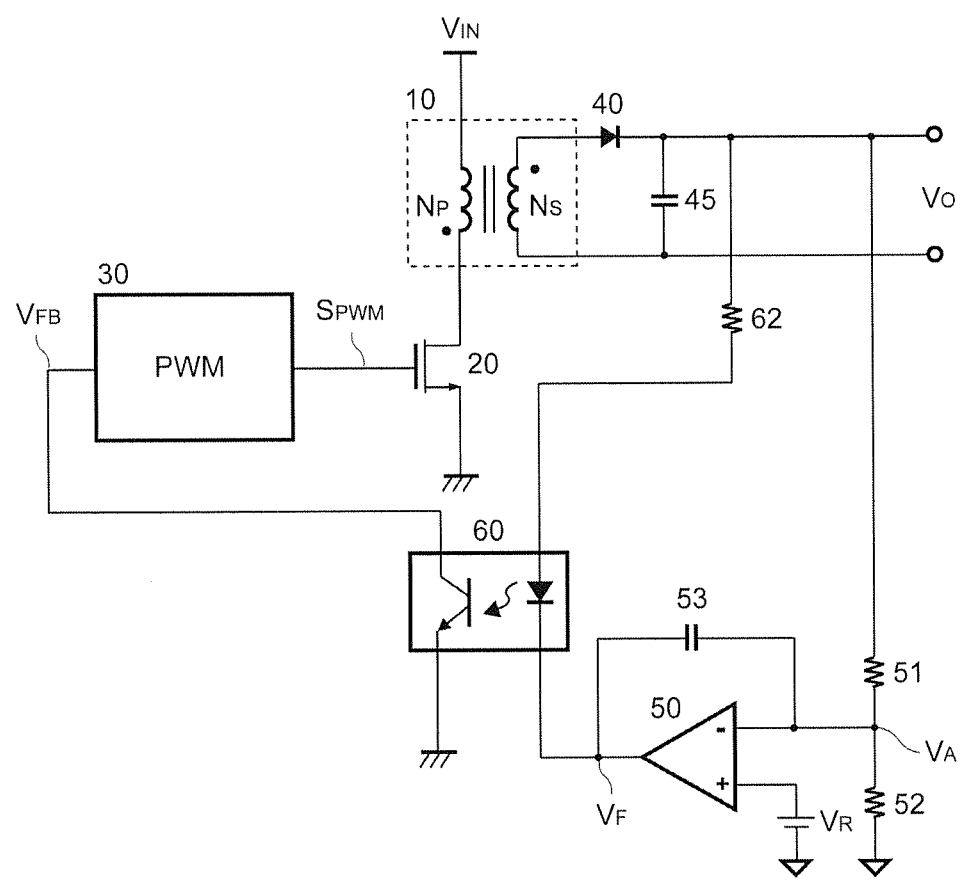
FIG. 1 shows a circuit diagram of a conventional power converter.

The power converter has a synchronous rectifying circuit to improve the power efficiency of the power converter. The synchronous rectifying circuit includes the synchronous rectifying controller 70 and the power transistor 75 having a parasitic diode 76. The power transistor 75 is used for a synchronous rectifier to replace the rectifier 40 (shown in FIG. 1) for rectification. A drain terminal of the power transistor 75 is coupled to the secondary winding $N_S$, and a source terminal of the power transistor 75 is coupled to the output terminal of the power converter. The parasitic diode 76 is coupled between the drain terminal and the source terminal of the power transistor 75. The synchronous rectifying controller 70 generates a synchronous rectifying signal (SR signal) $S_{SR}$ coupled to a gate terminal of the power transistor 75 to control the on/off of the power transistor 75.

The detail operation of the synchronous rectifying circuit can be found in the prior art of "Synchronous rectification circuit for power converters", U.S. Pat. No. 7,440,298. Refer to equation (9) of this prior art, it is, $$T_{discharge} = \frac{V_S}{V_O} \times T_{charge} \quad (1)$$

where the $T_{charge}$ is equal to the on-time $T_{ON}$ of the switching signal $S_{PWM}$; $T_{discharge}$ is the "turn on period" of the SR signal $S_{SR}$. The $V_S$ is the magnetized voltage that is correlated to the input voltage $V_{IN}$ of the power converter. Thus, the equation (1) can be rewritten as equation (2), $$T_{SSR} = \frac{K \times V_{IN}}{V_O} \times T_{ON} \quad (2)$$

where K is a constant.

Refer to an output power $P_O$ of the flyback power converter, it can be expressed as, $$P_O = V_O \times I_O = \frac{V_{IN}^2 \times T_{ON}^2}{2 \times L_P \times T} \quad (3)$$

where $L_P$ is the inductance of the primary winding $N_P$ of the transformer 10; T is the switching period of the switching signal $S_{PWM}$.

In accordance with the equations (2) and (3), if the output voltage $V_O$ is fixed value, then the period $T_{SSR}$ ("turn on period" of the SR signal $S_{SR}$) is correlated to the output current $I_O$. In other words, the SR signal $S_{SR}$ is correlated to the output current $I_O$. Therefore, the SR signal $S_{SR}$ can be used instead of the output current $I_O$ to control the output voltage $V_O$ for the cable compensation.

The regulation circuit 100 is coupled to receive the SR signal $S_{SR}$ and the signal $V_A$ for generating the signal $V_F$. The signal $V_F$ is future coupled to drive the opto-coupler 60 and generate the feedback signal $V_{FB}$. The signal $V_A$ is produced in accordance with the output voltage $V_O$ via the voltage divider developed by the resistors 51 and 52. Therefore, the regulation circuit 100 is used for generating the feedback signal $V_{FB}$ in accordance with the output voltage $V_O$. The voltage drop of the output voltage $V_O$ in the output cable can be compensated by the control of the SR signal $S_{SR}$. Further, a resistor 115 is coupled to a terminal $R_P$ of the regulation circuit 100.

Figure 3:
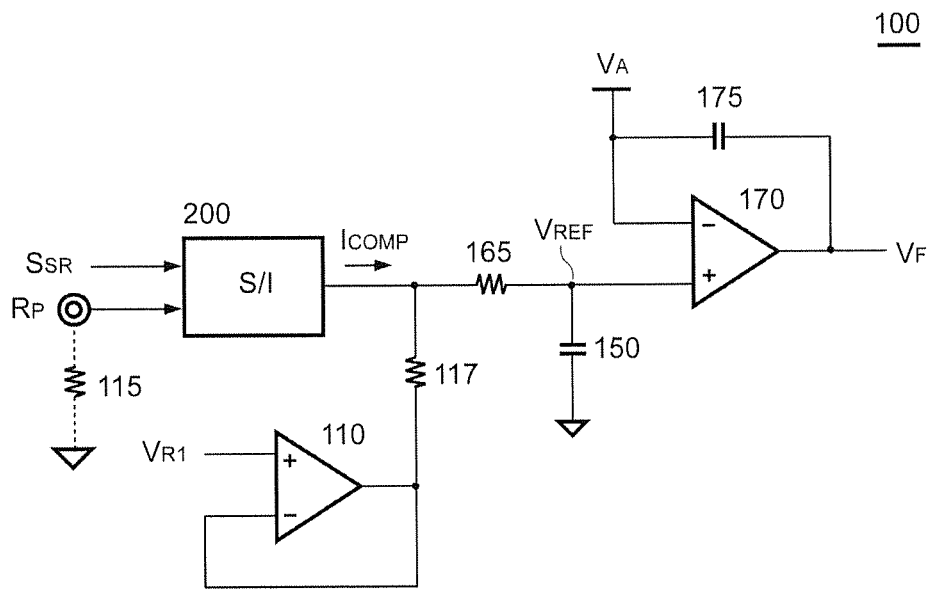
FIG. 3 shows a circuit diagram of a preferred embodiment of the regulation circuit in accordance with the present invention.

FIG. 3 is a circuit diagram of a preferred embodiment of the regulation circuit 100 according to the present invention. A signal generator (S/I) 200 is coupled to receive the SR signal $S_{SR}$ for generating a compensation signal $I_{COMP}$. The resistor 115 is coupled to the terminal $R_P$ of the signal generator 200 to determine the ratio of signal generation. The resistor 115 is used for programming the level of the compensation signal $I_{COMP}$ in accordance with the SR signal $S_{SR}$. An output terminal of a buffer amplifier 110 having a reference voltage $V_{R1}$ supplied with a positive input terminal of the buffer amplifier 110 is coupled to a resistor 117. The resistor 117 is further coupled to an output terminal of the signal generator 200. A negative input terminal of the buffer amplifier 110 is coupled to the output terminal of the buffer amplifier 110 and the resistor 117. The compensation signal $I_{COMP}$ and the resistor 117 are utilized to generate a compensation voltage at the resistor 117.

A resistor 165 and a capacitor 150 develop a filter coupled to the output terminal of the signal generator 200 and the resistor 117. The resistor 165 is coupled from the output terminal of the signal generator 200 and the resistor 117 to a terminal of the capacitor 150. The other terminal of the capacitor 150 is coupled to the ground. Through the filter, a reference signal $V_{REF}$ is generated at the capacitor 150.

$$V_{REF} = V_{R1} + (I_{COMP} \times R_{117}) \quad (4)$$

The capacitor 150 of the filter is used for filtering the reference signal $V_{REF}$. According to equation (4), the reference signal $V_{REF}$ is correlated to the compensation signal $I_{COMP}$. Therefore, the compensation signal $I_{COMP}$ can program and compensate the reference signal $V_{REF}$, and the reference signal $V_{REF}$ is programmable in response to the output current $I_O$ (as shown in FIG. 2) due to the compensation signal $I_{COMP}$ is correlated to the SR signal $S_{SR}$ and the SR signal $S_{SR}$ is correlated to the output current $I_O$. Further, according to equation (4), the reference signal $V_{REF}$ is further correlated to the reference voltage $V_{R1}$ of the buffer amplifier 110. Therefore, the buffer amplifier 110 is coupled to the compensation signal $I_{COMP}$ for generating the reference signal $V_{REF}$.

An error amplifier 170 is coupled to receive the reference signal $V_{REF}$ and the signal $V_A$ to generate the signal $V_F$ for generating the feedback signal $V_{FB}$ (as shown in FIG. 2). A positive input terminal and a negative input terminal of the error amplifier 170 receive the reference signal $V_{REF}$ and the signal $V_A$ respectively. An output terminal of the error amplifier 170 generates the signal $V_F$. A capacitor 175 is coupled between the negative input terminal of the error amplifier 170 and the output terminal of the error amplifier 170.

Figure 4:
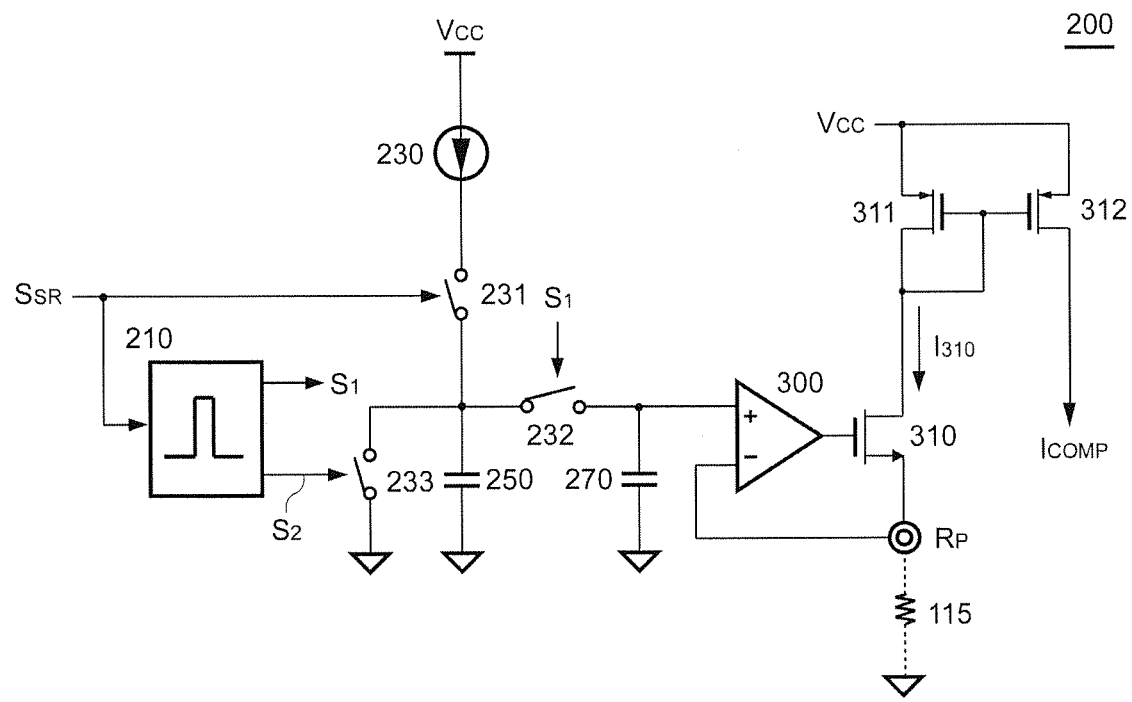
FIG. 4 shows a circuit diagram of a preferred embodiment of the signal generator in accordance with the present invention.
Figure 5:
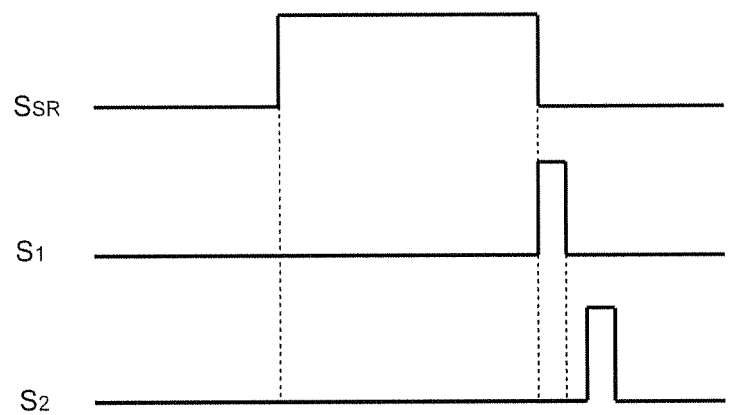
FIG. 5 shows the waveforms of the SR signal $S_{SR}$ and the pulse signals $S_1$ and $S_2$ of the pulse generator in accordance with the present invention.

FIG. 4 is a circuit diagram of a preferred embodiment of the signal generator 200 according to the present invention. A pulse generator 210 receives the SR signal $S_{SR}$ and generates pulse signals $S_1$ and $S_2$ in response to the SR signal $S_{SR}$. The waveforms of the pulse signals $S_1$ and $S_2$ are shown in FIG. 5. The first pulse signal $S_1$ is enabled when the SR signal $S_{SR}$ is disabled. Once the first pulse signal $S_1$ is disabled, the second pulse signal $S_2$ is enabled after a delay time. The SR signal $S_{SR}$ is further coupled to control a charge circuit to charge a capacitor 250 for providing a voltage. The voltage provided by the capacitor 250 is correlated the SR signal $S_{SR}$. The charge circuit includes a current source 230 and a charge switch 231. The current source 230 is coupled between a supply voltage $V_{CC}$ and the charge switch 231 to charge the capacitor 250 through the charge switch 231. The capacitor 250 is coupled from the charge switch 231 to the ground. The charge switch 231 is controlled by the SR signal $S_{SR}$.

The first pulse signal $S_1$ is coupled to control a sample switch 232 for sampling the voltage of the capacitor 250 to a capacitor 270. The sample switch 232 is coupled between the capacitor 250 and the capacitor 270. The capacitor 270 is further coupled to the ground.

The second pulse signal $S_2$ is coupled to control a discharge switch 233 for discharging the capacitor 250. The discharge switch 233 is coupled between the capacitor 250 and the ground. The voltage of the capacitor 270 is correlated to the voltage of the capacitor 250. The capacitor 270 is further coupled to a voltage to current converter to convert the voltage of the capacitor 270 to a current $I_{310}$ for generating the compensation signal $I_{COMP}$. In other words, the voltage to current converter converts the voltage of the capacitor 250 to the current $I_{310}$ for generating the compensation signal $I_{COMP}$. The voltage to current converter includes an operational amplifier 300 and a transistor 310. The resistor 115 (at RP terminal) is coupled to the voltage to current converter.

The capacitor 270 is coupled to a positive input terminal of the operational amplifier 300. A negative input terminal of the operational amplifier 300 is coupled to a source terminal of the transistor 310 and the resistor 115 through the RP terminal. The source terminal of the transistor 310 is coupled to the resistor 115 through the RP terminal. The voltage to current converter converts the voltage of the capacitor 270 to the current $I_{310}$ at a drain terminal of the transistor 310 in accordance with the resistance of the resistor 115 (at RP terminal). The resistor 115 is utilized to program the current $I_{310}$ in accordance with the SR signal $S_{SR}$ for programming the level of the compensation signal $I_{COMP}$.

A gate terminal of the transistor 310 is controlled by an output terminal of the operational amplifier 300 for producing the current $I_{310}$. The current $I_{310}$ is further coupled to a current mirror formed by transistors 311 and 312. The current mirror generates the compensation signal $I_{COMP}$. Source terminals of the transistors 311 and 312 are coupled to the supply voltage $V_{CC}$. Gate terminals of the transistors 311 and 312 and drain terminals of the transistors 310 and 311 are coupled together. A drain terminal of the transistor 312 generates the compensation signal $I_{COMP}$.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A regulation circuit of a power converter, comprising:
    a signal generator generating a compensation signal in accordance with a synchronous rectifying signal; and
    an error amplifier having a reference signal for generating a feedback signal in accordance with an output voltage of the power converter;
    wherein the compensation signal is coupled to program the reference signal; the feedback signal is coupled to generate a switching signal for regulating an output of the power converter.

2. The regulation circuit as claimed in claim 1, further comprising:
    a resistor coupled to the signal generator for programming the level of the compensation signal in accordance with the synchronous rectifying signal.

3. The regulation circuit as claimed in claim 1, further comprising:
    a filter coupled to the reference signal for filtering the reference signal.

4. The regulation circuit as claimed in claim 3, wherein the filter comprises:
    a capacitor for filtering the reference signal.

5. The regulation circuit as claimed in claim 1, wherein the synchronous rectifying signal is utilized to control a power transistor coupled to the power converter; wherein the power transistor is used for a synchronous rectifier.

6. The regulation circuit as claimed in claim 1, wherein the synchronous rectifying signal is correlated to an output current of the power converter.

7. The regulation circuit as claimed in claim 1, further comprising:
    A buffer amplifier having a reference voltage and coupled to the compensation signal for generating the reference signal.

8. The regulation circuit as claimed in claim 1, wherein the signal generator comprises:
    a capacitor providing a voltage for generating the compensation signal; and
    a charge circuit charging the capacitor in response to the synchronous rectifying signal for providing the voltage;
    wherein the voltage is correlated to the synchronous rectifying signal.

9. The regulation circuit as claimed in claim 8, wherein the signal generator further comprises:
    a voltage to current converter converting the voltage to a current for generating the compensation signal; and
    a resistor coupled to the voltage to current converter to program the current in accordance with the synchronous rectifying signal for programming the level of the compensation signal.

10. A method for a regulation circuit of a power converter, comprising:
    receiving a synchronous rectifying signal for generating a compensation signal;
    compensating a reference signal of an error amplifier of the regulation circuit in accordance with the compensation signal; and
    generating a feedback signal in accordance with the reference signal and an output voltage of the power converter;
    wherein the feedback signal is coupled to generate a switching signal for regulating an output of the power converter.

11. The method as claimed in claim 10, further comprising:
    programming the level of the compensation signal in accordance with the synchronous rectifying signal.

12. The method as claimed in claim 10, wherein the synchronous rectifying signal is utilized to control a power transistor coupled to the power converter; wherein the power transistor is used for a synchronous rectifier.

13. The method as claimed in claim 10, wherein the synchronous rectifying signal is correlated to an output current of the power converter.

14. The method as claimed in claim 10, further comprising:
    charging a capacitor in response to the synchronous rectifying signal to provide a voltage for generating the compensation signal;
    wherein the voltage is correlated to the synchronous rectifying signal.

15. The method as claimed in claim 14, further comprising:
    converting the voltage to a current for generating the compensation signal; and
    programming the current in accordance with the synchronous rectifying signal for programming the level of the compensation signal.

* * * * *